United States Patent Office 3,842,076
Patented Oct. 15, 1974

3,842,076
NOVEL TRIAZASPIRO[4,5]DECAN-4-ONE
DERIVATIVES
Willem Soudijn, Turnhout, Ineke van Wijngaarden, Beerse, and Paul Adriaan Jan Janssen, Vosselaar, Belgium, assignors to Janssen Pharmaceutica N.V., Beerse, Belgium
No Drawing. Filed Feb. 26, 1973, Ser. No. 335,847
Int. Cl. C07d 29/26
U.S. Cl. 260—240 TC       3 Claims

ABSTRACT OF THE DISCLOSURE

The compounds, 8-[3-(10,11-dihydro-5H-dibenzo[a,d]cyclohepten - 5 - ylidene)propyl] - 1 - phenyl-1,3,8-triazaspiro[4,5]decan-4-one and 8-[3-(5H-dibenzo[a,d]cyclohepten - 5 - ylidene)propyl]-1-phenyl - 1,3,8 - triazaspiro[4,5]decan-4-one, useful as neuroleptic agents.

DESCRIPTION OF THE INVENTION

This invention relates to novel triazaspiro[4,5]decan-4-one derivatives which may be structurally represented by the formula:

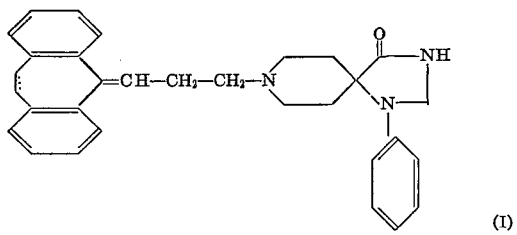

(I)

wherein the dotted line represents an optional double bond. Without such double bond, the triazaspiro[4,5]decan-4-one derivative is 8-[3-(10,11-dihydro-5H-dibenzo[a,d]cyclohepten-5-ylidene)propyl]-1-phenyl - 1,3,8 - triazaspiro[4,5]decan-4-one; and with the double bond, the triazaspiro[4,5]decan - 4 - one derivative is 8-[3-(5H-dibenzo[a,d]cyclohepten - 5 - ylidene)propyl] - 1 - phenyl-1,3,8-triazaspiro[4,5]decan-4-one.

The subject compounds (I) are prepared by reacting an appropriate dibenzo[a,d]cycloheptene of formula (II), wherein X is a reactive ester of the corresponding alcohol, e.g., chloro, bromo, mesylate, tosylate and the like, preferably chloro or bromo, with 1-phenyl-1,3,8-triazaspiro[4,5]decan-4-one (III). This condensation reaction is conveniently conducted in an inert organic solvent such as, for example, an aromatic hydrocarbon, e.g., benzene, toluene, xylene and the like; a lower alkanol, e.g., methanol, ethanol, n-butanol and the like; a ketone, e.g., 4-methyl-2-pentanone, butanone, and the like; an ether, e.g., dioxane, diethyl ether and the like; dimethylformamide (DMF); nitrobenzene, and the like. The addition of an acid acceptor, i.e., an appropriate base such as, for example, an alkali metal carbonate or bicarbonate, or an organic tertiary amine such as, for example, a trialkylamine, e.g., triethylamine, tributylamine and the like, or a heterocyclic amine, e.g., pyridine, quinoline and the like, may be utilized to bind the acid that is liberated during the course of the reaction. The amount of acid acceptor that may be employed is not critical, but, for optimum conditions, the theoretical number of moles of liberated acid can easily be calculated from the quantities of reactants employed and, thus, the corresponding amount of acid acceptor that need be employed can readily be determined. When X is halo, the presence of catalytic amounts of potassium iodide may also be utilized. Elevated temperatures may be employed to enhance the rate of reaction.

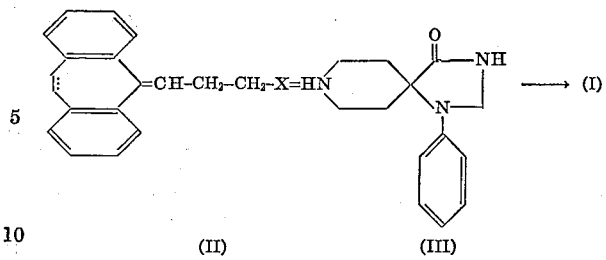

(II)        (III)

The compounds of formula (I) have been found to possess central nervous system (CNS) depressant activity similar to the neuroleptic activity of butyrophenones, for example, haloperidol (see U.S. Pat. No. 3,438,991) and of certain triazaspiro[4,5]decan-4-ones, e.g., fluspirilene (see U.S. Pat. No. 3,238,216) and of the 4-aryl-4-hydroxypiperidines described in U.S. Pat. No. 3,575,990. Although the subject compounds are qualitatively similar in neuroleptic activity to haloperidol, they differ significantly from the latter in their longer duration of action, similar to said fluspirilene and to said 4-aryl-4-hydroxypiperidines.

Neuroleptic drugs are known to block apomorphine-induced vomiting in dogs. In the anti-apomorphine test [see "Method 1" in Janssen, P. A. J. et al., Arzneim.-Forsch., 15, 1196 (1965)], the compound to be tested is given orally followed at different time intervals thereafter by the standard dose of apomorphine (0.31 mg./kg. s.c.) which will induce vomiting in untreated dogs. Anti-apomorphine activity is demonstrated with the compounds (I) at oral dose levels as low as 0.005 mg./kg. and at $ED_{50}$ values of about 0.02/1.0 mg./kg. orally. The $ED_{50}$ value (in mg./kg.) is the oral dose level of the tested compound protecting 50% of the animals from emesis. In Table 1, the $ED_{50}$ values of the duration of activity of the compounds described herein are given.

Another characteristic of neuroleptic drugs is their ability to antagonize amphetamine-induced CNS-stimulation. In the amphetamine antagonism test, male Wistar rats are pretreated with an oral dose of the compound to be tested and challenged one hour thereafter with a standard dose of amphetamine (5 mg./kg. i.v.). In untreated animals, the standard dose of amphetamine will induce typical CNS-stimulation, e.g., agitation and stereotyped chewing. These phenomena are antagonized by neuroleptic drugs. The data in Table 1 shows the oral dose levels at which the subject compounds protect the rats against the amphetamine-induced agitation and chewing.

TABLE 1

| Compound of example | Anti-apomorphine test in dogs (oral) | | Amphetamine antagonism in rats (oral), $ED_{50}$, mg./kg. |
|---|---|---|---|
| | $ED_{50}$, mg./kg. | Duration, hours | |
| I | 0.40 | 65 | 10.0 |
| II | 0.35 | 40 | 2.5 |

The following examples are intended to illustrate, but not to limit, the scope of the present invention. Unless otherwise stated, all parts are by weight.

EXAMPLE I

A mixture of 1.63 parts of 5-(3-bromopropylidene)-10,11-dihydro-5H-dibenzo[a,d]cycloheptane, 1.16 parts of 1-phenyl-1,3,8-triazaspiro[4,5]decan-4-one, 0.8 parts of anhydrous sodium carbonate and 7.5 parts of dimethylformamide is stirred for 3 hours in an oil-bath at 105° C. The reaction mixture is cooled, filtered over hyflo and the filtrate is diluted with water. The precipitated product is filtered off, washed with water and dried. The crude product is dissolved in boiling ethyl acetate. After cooling, the product is crystallized. It is filtered off and dried, yielding 8-[3 - (10,11 - dihydro - 5H - dibenzo[a,d]cyclohepten-5-ylidene)propyl - phenyl - 1,3,8 - triazaspiro[4,5]decan-4-one; m.p. 194.1° C.

EXAMPLE II

A mixture of 2.1 parts of 5-(3-bromopropylidene)-5H-dibenzo[a,d]cycloheptene, 1.38 parts of 1-phenyl-1,3,8-triazaspiro[4,5]decan-4-one, 9.6 parts of sodium carbonate and 15 parts of dimethylformamide is heated for 3 hr., 30 min. in an oil-bath at 110° C. while stirring. The reaction mixture is cooled, filtered over hyflo and upon dilution of the filtrate with water, sticky crystals are precipitated. They are filtered off and crystallized twice: first from hot ethyl acetate and then from 2-propanol, yielding 8-[3 - (5H - dibenzo[a,d]cyclohepten-5-ylidene)propyl]-1-phenyl-1,3,8-triazaspiro[4,5]decan - 4 - one; m.p. 218.6° C. (dec.).

We claim:

1. A triazaspiro[4,5]decan-4-one derivative having the formula:

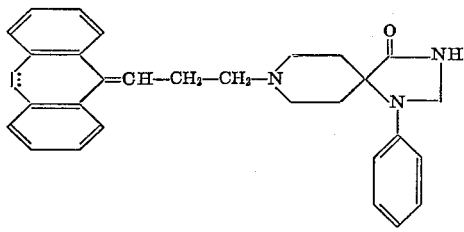

wherein the dotted line represents an optional double bond.

2. 8 - [3 - (10,11 - dihydro - 5H - dibenzo[a,d]cyclohepten - 5 - ylidene)propyl] - 1 - phenyl - 1,3,8-triazaspiro[4,5]decan-4-one.

3. 8 - [3 - (5H - dibenzo[a,d]cyclohepten - 5-ylidene)-propyl]-1-phenyl-1,3,8-triazaspiro-[4,5]decan-4-one.

References Cited

UNITED STATES PATENTS

| 3,073,847 | 1/1963 | Doebel et al. | 260—328 |
| 3,454,643 | 7/1969 | Cope et al. | 260—570.8 TC |

FOREIGN PATENTS

| 24,589 | 11/1967 | Japan | 260—243 A |
| 2,163,657 | 7/1972 | Germany | 260—240 TC |

OTHER REFERENCES

Chemical Abstracts, vol. 69, Abst. No. 67,440m (abst. of Japanese Pat. 42/24,589 aboxe cited) (1968).

Chemical Abstracts, vol. 70, Abst. No. 77,149h (1969) (abst. of Lecolier, Chim. Ther. *1968*, 3 (3), pp. 193–9).

Chemical Abstracts, vol. 77, Abst. No. 139,838n (abst. of German Offen 2,163,657, pub. July 13, 1972) (1972).

JOHN D. RANDOLPH, Primary Examiner

U.S. Cl. X.R

424—267; 260—293.66